(12) United States Patent
Margaillan et al.

(10) Patent No.: US 9,676,946 B2
(45) Date of Patent: Jun. 13, 2017

(54) COATING COMPOSITION

(71) Applicant: AZ ELECTRONIC MATERIALS (LUXEMBOURG) S.A.R.L., Somerville, NJ (US)

(72) Inventors: Andre Margaillan, La Vallette (FR); Christine Bressy, La Valette (FR); Francois-Xavier Perrin, La Valette (FR)

(73) Assignee: AZ Electronic Materials (Luxembourg) S.A.R.L., Luxembourg (LU)

( * ) Notice: Subject to any disclaimer, the term of this patent is extended or adjusted under 35 U.S.C. 154(b) by 0 days.

(21) Appl. No.: 14/899,317

(22) PCT Filed: Jul. 1, 2014

(86) PCT No.: PCT/JP2014/067581
§ 371 (c)(1),
(2) Date: Dec. 17, 2015

(87) PCT Pub. No.: WO2015/002205
PCT Pub. Date: Jan. 8, 2015

(65) Prior Publication Data
US 2016/0185980 A1    Jun. 30, 2016

(30) Foreign Application Priority Data

Jul. 2, 2013 (JP) ................. 2013-139090

(51) Int. Cl.
| | |
|---|---|
| C09D 5/16 | (2006.01) |
| C09D 183/08 | (2006.01) |
| C09D 7/12 | (2006.01) |
| C09D 183/16 | (2006.01) |
| C08G 77/62 | (2006.01) |
| C08G 77/16 | (2006.01) |

(52) U.S. Cl.
CPC ............. *C09D 5/1675* (2013.01); *C09D 5/16* (2013.01); *C09D 7/12* (2013.01); *C09D 183/16* (2013.01); *C08G 77/16* (2013.01); *C08G 77/62* (2013.01)

(58) Field of Classification Search
CPC ......... C08L 83/00; C09D 183/16; C09D 5/16; C09D 5/1675; C09D 7/12
See application file for complete search history.

(56) References Cited

U.S. PATENT DOCUMENTS

| | | | |
|---|---|---|---|
| 6,255,373 B1 * | 7/2001 | Akamatsu ............ | C09D 183/04 106/287.11 |
| 2002/0165319 A1 | 11/2002 | Knasiak et al. | |
| 2008/0213599 A1 * | 9/2008 | Webster ............ | C08G 18/4063 428/423.1 |
| 2012/0264847 A1 * | 10/2012 | Thorlaksen .......... | C09D 5/1606 523/122 |

FOREIGN PATENT DOCUMENTS

| | | | | |
|---|---|---|---|---|
| JP | 05-238827 | * | 9/1993 | ............. C04B 35/58 |
| JP | 09-157528 | * | 6/1997 | ............. C08L 83/16 |
| JP | 09-157528 A | | 6/1997 | |
| JP | 05-238827 A | | 9/1998 | |
| JP | 2004-529998 A | | 9/2004 | |
| JP | 2011-148844 A | | 8/2011 | |
| JP | 2012-17374 A | | 1/2012 | |
| JP | 2012-153849 A | | 8/2012 | |

* cited by examiner

*Primary Examiner* — Anna Falkowitz
(74) *Attorney, Agent, or Firm* — Mitchell Brustein

(57) ABSTRACT

[Problem] To provide a coating composition, which can reduce a load to the environment and form a cured layer having corrosion resistance, antifouling property and high transparency.

[Means for Solution] A coating composition comprising (A) a polysilazane having alkoxy-modified silane group in a side chain, (B) non-reactive polydialkylsiloxane and (C) reactive polydialkylsiloxane, and a obtained cured layer therewith.

16 Claims, No Drawings

COATING COMPOSITION

This application is a United States National Stage Patent Application under 35 U.S.C. §371 of International Patent Application No. PCT/JP2014/067581, filed Jul. 1, 2014 which claims priority to Japanese Patent Application No. 2013-139090, filed Jul. 2, 2013, the contents of which are being hereby incorporated herein by reference.

BACKGROUND OF THE INVENTION

Technical Field

The present invention relates to a water-repellent antifouling coating composition comprising polyorganosilazane as a main component.

Background Art

As a ship used on the ocean always contacts with sea water, the surface of the ship is corroded and marine organisms such as algae and shellfishes attach to it. To prevent such corrosion and fouling, antifouling coating on the surface have been generally applied. For the antifouling coating, coating compositions containing organotin compounds have been used.

However, these organotin compounds are suspected as endocrine disrupters and the use of it has been strictly limited. Therefore, alternative antifouling coating composition has been developed.

Antifouling coating compositions currently being considered can be roughly classified into the followings: (a) a coating composition comprising insoluble resin as a main component and an antifoulant, (b) a coating composition comprising soluble resin or hydrolysable resin as a main component and an antifoulant, and (c) a coating composition type comprising fouling stripping type low-modulus resin as a main component not containing an antifoulant.

On the other hand, an antifouling coating composition desirably satisfies the followings: (1) preparing non-solvent composition to prevent the coating layer from releasing residual organic solvent, (2) not using hazardous or suspected hazardous antifoulant, (3) obtaining coating having sufficient characteristic by one painting, unnecessary to be repeatedly applied, to reduce manufacturing cost at painting, (4) being hardly corroded due to dipping in sea water to prevent further anticorrosion treatment, and (5) being high transparency and not spoiling the external appearance such as designs formed on the undercoating layer.

To meet such needs, various coating compositions are considered. For example, a coating composition comprising polysilazane, polysiloxane, and curing catalyst is disclosed in Patent Document 1. However, according to inventors of the present invention, the composition disclosed in the literature contains curing catalyst and the composition is cured by a condensation reaction of the silanol group. Accordingly, defects such as crack are generated when thick cured layer are formed. There was room for improvement.

PRIOR ART DOCUMENTS

Patent Documents

[Patent document 1] Japanese Patent Publication No. 2012-017374

SUMMARY OF THE INVENTION

Problems to be Solved by the Invention

However, previous antifouling coating compositions cannot satisfy all characteristics as above mentioned. New antifouling coating composition has been desired to be developed.

Means for Solving the Problems

A coating composition of the present invention comprises;
(A) a polysilazane having alkoxy-modified silane group in a side chain,
(B) a terminally alkylated polydialkylsiloxane, and
(C) a polydialkylsiloxane having hydroxyl group at its terminal.

Further, a cured film of the present invention is obtained by coating the coating composition on a substrate and curing.

Further, a ship of the present invention is covered with the cured film.

Effects of the Invention

The present invention enables to provide a coating composition which satisfies (1) not containing organic solvent, (2) not using hazardous antifoulant, and (3) obtaining coating having sufficient characteristic by one painting, unnecessary to be repeatedly applied. Then, this coating composition enables to obtain cured coatings suitable for the external appearance for such as ships and underwater structures, which satisfy (4) excellent corrosion resistance and antifouling property, and (5) high transparency.

DETAILED DESCRIPTION OF THE INVENTION

Mode for Carrying Out the Invention

Embodiments of the present invention are described below in detail.

Coating Composition

A coating composition of the present invention comprises following three polymer components;
(A) a polysilazane having alkoxy-modified silane group in a side chain,
(B) a terminally alkylated polydialkylsiloxane, and
(C) a polydialkylsiloxane having hydroxyl group at its terminal.

These polymer components and other optional additives are described below.

(1) Polymer Components (A) A Polysilazane Having Alkoxy-modified Silane Group in a Side Chain A polysilazane used for the present invention functions mainly as a binder when coating is formed. This polysilazane has a main chain structure comprising silicon and nitrogen, to which hydrogen or hydrocarbon group is bonded, similar to a general polysilazane, but the present invention is characterized by further having alkoxy-modified silane group in a side chain in the present invention. This alkoxy-modified silane group promotes cross-linking reaction of the components of the composition to form a cured film. Thus, a catalyst for curing reaction or a polymerization initiator is not required for the coating composition of the present invention. However, too rapid curing reaction sometimes causes problems such as cracks in a cured film. In this respect, alkoxy-modified silane group is preferably trialkoxy silane group to regulate the rate of curing reaction. The alkoxy group constituting trialkoxy silane group has preferably 1 to 3 carbon atoms and especially ethoxysilane group is preferred.

A polysilazane which can be used for the present invention is preferably represented by the formula(a);

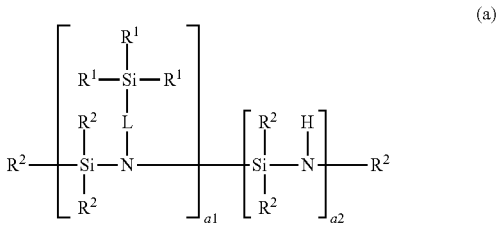

wherein
R$^1$ is hydrogen, alkyl group of 1 to 3 carbon atoms, or alkoxy group of 1 to 3 carbon atoms,
where at least one R$^1$ is alkoxy group, and each R$^1$ may be the same or different,
R$^2$ is hydrogen or alkyl group of 1 to 3 carbon atoms, where each R$^2$ may be the same or different, and two R$^2$ in the formula may be bounded to form a cyclic structure, and any R$^2$ in the formula and other polysilazane polymer unit R$^2$ represented by (a) may be bounded to form branched chain structure,
L is alkylene group of a single bond or 1 to 5 carbon atoms, where each L may be the same or different,
a1 and a2 are the numbers indicating polymerization degrees of the first repeating unit and the second repeating unit, and each number is exceeding 0,
the first repeating unit and the second repeating unit may be bounded randomly or may form blocks.

A polysilazane represented by formula (a) contains the first repeating unit having alkoxy silane group in a side chain and the second repeating unit not having alkoxy silane group, as is evident from above formula. Here, the first repeating unit and the second repeating unit may be their combination having respectively different substituents.

One of the first repeating unit is having alkoxy silane group in a side chain. Here, alkoxy silane group is, directly or through hydrocarbon, bounded to nitrogen atoms which are main chain of polysilazane. Specifically, in the formula (a), L is preferably alkylene group of a single bond or 1 to 5 carbon atoms, more preferably alkylene group of 2 to 4 carbon atoms.

The first repeating unit has alkoxy silane group and this group become active moiety when coating composition is cured, as noted above. This alkoxy silane group is required to have at least one alkoxy group, preferably three alkoxy groups. When the number of alkoxy groups is one or two, hydrogen or alkyl group of 1 to 3 carbon atoms can be bounded to non-bound hand of silicon atoms constituting alkoxy silane group. The number of carbons of alkoxy group is preferably 1 to 3.

As the invention uses a polysilazane having this alkoxy silane group, the composition do not require a curing catalyst. Thus, surface defects by using a curing catalyst can be reduced. Therefore, the coating composition of the present invention preferably contains no curing catalyst which is generally used.

Both the first repeating unit and the second repeating unit contain silicon atoms constituting a main structure of the polysilazane. These silicon atoms are bounded to nitrogen atoms constituting neighboring repeating units and have other two non-bound hands. These bonding hands are bounded to hydrogen or alkyl group of 1 to 3 carbon atoms. At least one bonding hand of these two is preferably bound to alkyl group. The polysilazane represented by formula (a) has linear chain structure, branched chain structure or cyclic structure and hydrogen or alkyl group of 1 to 3 carbon atoms is bound at terminal of the polysilazane. The polysilazane having linear chain structure is preferred.

The copolymerization ratio of the first repeating unit and the second repeating unit in the polysilazane represented by formula (a) can be properly adjusted depending on substituents constituting repeating units, curing rate of the coating composition and all. However, the ratio of the first repeating unit is preferably high to obtain enough curing rate after coating the coating composition. On the other hand, the ratio of the second repeating unit is high to prevent defects such as cracks. In this respect, the blending ratio of the first repeating unit and the second repeating unit, that is a1:a2 in formula (a), is preferably 0.01:0.99 to 0.35:0.65, more preferably 0.08:0.92 to 0.25:0.75. Further, the polysilazane used for the present invention can contain a repeating unit other than the first repeating unit or the second repeating unit unless it impairs the effect of the invention.

The weight-average molecular weight of the polysilazane represented by formula (a) is not particularly limited, but it is preferably 500 to 50,000, more preferably 1,000 to 20,000, to maintain sufficiently level for such as coating properties of the coating composition and mechanical characteristics of the cured film. Here, the weight-average molecular weight means for the weight-average molecular weight in terms of styrene by gel permeation chromatography.

A polysilazane used for the present invention is preferably a liquid at ordinary temperatures. If the polysilazane in the coating composition of the present invention is a liquid, it is easy to obtain a liquid composition without using a solvent as a component of the coating composition of the present invention. When the polysilazane is a liquid, the kinematic viscosity at room temperature is preferably 5 to 200 cst.

(B) A Terminally Alkylated Polydialkylsiloxane

The coating composition of the present invention comprises a terminally alkylated polydialkylsiloxane. This siloxane compounds have low reactivity since of the inactive terminal, and have little contribution to curing reaction of the coating composition. However, the siloxane compounds and the active polymer component become a matrix to form a cured film and the siloxane compounds have an effect of improving the water repellency of the cured film.

Polydialkylsiloxane (B) represented by following formula (b) is preferably used in the present invention.

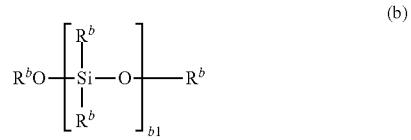

wherein $R^b$ is alkyl group of 1 to 3 carbon atoms and each $R^b$ may be the same or different, two $R^b$ in the formula may be bounded to form a cyclic structure, or any of $R^b$ in the formula and other dialkylsiloxane unit $R^b$ represented by the formula (b) may be bounded to form branched chain structure, and b1 is the number indicating degree of polymerization and exceeding 0.

A polydialkylsiloxane represented by the formula (b) may have a linear chain structure, a branched chain structure or a cyclic structure. The linear chain structure is preferable in these structures.

The weight-average molecular weight of polydialkylsiloxane represented by the formula (b) is not particularly limited, but it is preferably 350 to 70,000, more preferably 1,000 to 35,000, to maintain sufficiently level for such as coating properties of the coating composition and mechanical characteristics of the cured film Polydialkylsiloxane (B) used for the present invention is preferably a liquid at ordinary temperatures. If this polydialkylsiloxane (B) is a liquid, it is easy to obtain a liquid composition as component of coating composition of the present invention without using a solvent. When polydialkylsiloxane (B) is a liquid, the kinematic viscosity at room temperature is preferably 2 to 20,000 cst, more preferably 10 to 2,000 cst. The kinematic viscosity is preferably 20,000 cst or less since a phase separation, which makes difficult to form a coating layer, is least likely to occur.

(C) Polydialkylsiloxane Having Hydroxyl Group at its Terminal

The coating composition of the present invent comprises a polydialkylsiloxane having hydroxyl group at its terminal. As this siloxane compound has a main chain structure similar to said polydialkylsiloxane, it has an effect of improving the water repellency of the cured film. On the other hand, it has hydroxyl group, which is active group, and reacts with said polysilazane (A) to contribute to form a cured film. It also has an effect of reducing Young's modulus of a cured film. As a result, the thickness of the cured film can be increased.

A polydialkylsiloxane (C) represented by following formula (c) is preferably used in the present invention.

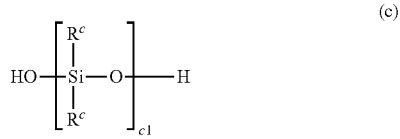

(c)

wherein $R^c$ is alkyl group of 1 to 3 carbon atoms, each $R^c$ may be the same or different, two $R^c$ in the formula may be bounded to form a cyclic structure, or any of $R^c$ and $R^c$ of other polydialkylsiloxane unit represented by formula (c) may be bounded to form branched chain structure, and c1 is the number indicating degree of polymerization and exceeding 0.

The polydialkylsiloxane represented by formula (c) has linear chain structure, branched chain structure, or cyclic structure. The linear chain structure is preferable in these structures.

The weight-average molecular weight of the polydialkylsiloxane represented by formula (c) is particularly limited, but it is preferably 700 to 90,000, more preferably 1,000 to 80,000, to maintain sufficiently level for such as coating properties of the coating composition and mechanical characteristics of the cured film.

The polydialkylsiloxane (C) used for the present invention is preferably a liquid at ordinary temperatures as well as polydialkylsiloxane (B). If the polydialkylsiloxane (C) is a liquid, the kinematic viscosity at room temperature is preferably 5 to 50,000 cst, more preferably 10 to 30,000 cst. The kinematic viscosity is preferably 50,000 cst or less since coating process becomes easy without a solvent. Further, the kinematic viscosity of the polydialkylsiloxane (B) is preferably low to prevent a phase separation of the coating.

The compounding ratio of these polymer components of the present invention can be optionally adjusted corresponding to kinds of polymer component, applications of the cured layer and all. However, when used for the coating of ships, to achieve enough antifouling property, corrosion resistance, the compounding amount of said polydialkylsiloxane (B) and said polydialkylsiloxane (C) is preferably each 3 to 20 parts by weight and 7 to 30 parts by weight, more preferably each 5 to 10 parts by weight and 10 to 20 parts by weight per said polysilazane (A) 100 parts by weight. In the compounding ratio, the amount of polydialkylsiloxane (B) is preferably lower than that of polydialkylsiloxane (C).

(2) Antifoulant

A cured film formed by the coating composition of the present invention can achieve excellent antifouling property, even if the composition is consist of only previously mentioned polymer components. The cured film formed by the composition consisting of only previously mentioned polymer components can also achieve high transparency. When, for example, a cured film is formed on a substrate having patterns as a coating layer, the coating composition of the present invention preferably contains no antifoulant.

On the other hand, higher antifouling property is sometimes desired at the sacrifice of transparency. For example, when bottom structures of ships are coated, high antifouling property is preferred to designs. In this case, an antifoulant is can be added in addition to previously mentioned polymer components. In this case, arbitrary antifoulant can be used. However, organotin, organoarsenic, organomercury and the like are not preferably used since they cause high environmental burden. The antifoulant used for coating composition of the present invention include pyrithiones such as cuprous oxide ($Cu_2O$) and zinc pyrithione, if necessary. Cuprous oxide is most preferred in them. When the coating composition of the present invention includes cuprous oxide, the amount of it can be 50 vol. % or less. If the composition include about 40 vol. %, it can achieve high antifouling property.

(3) Young's Modulus Modifier

The cured film formed by using the coating composition of the present invention is often used for coating. Especially when used for exterior of ships and all, the coating is required to have mechanical characteristics since stress is often applied to the coating. For example, excessively high Young's modulus tends to bring coatings to destruction by stress. Thus, it is required to adjust Young's modulus at a suitable level. For such purpose, the coating composition of the present invention can contain acrylate resin or methacrylate resin. Acrylic polyol is preferable as the resin. As acrylic polyol have hydroxyl group, it reacts with above mentioned polysilazane (A) or above mentioned dialkylsiloxane (C) to have reducing action of Young's modulus of the cured film. For example, Setalux 1184, 1903(both trade name, Nuplex Corpotate in USA) and all are commercially available as this acrylic polyol. 5 to 20 parts by weight of Young's modulus modifier is preferably added per above mentioned polysilazane (A) 100 parts by weight, if used.

(4) Solvent

The coating composition of the present invention do not have to further contain a solvent if any one of the components of the above mentioned polymers is a liquid at ordinary temperature. The coating composition without a solvent can reduce environmental burden since the cured film formed by the composition do not elute in a solvent by bringing it into contact with water. Further, manufacturing cost can be reduced since coating composition with low non-volatile constituent can form thick coating layer on the substrate by one coating to obtain a cured film, without several coatings. Preferably, the coating composition does not contain a solvent from these points.

Here, a solvent means that it is a liquid at ordinary temperature and can solve each constituent of the coating composition. Specifically, it includes ethylene glycol monoalkyl ethers such as ethylene glycol monomethyl ether, ethylene glycol monoethyl ether, ethylene glycol monopropyl ether and ethylene glycol monobutyl ether, diethylene glycol dialkyl ethers such as diethylene glycol dimethyl ether, diethylene glycol diethyl ether, diethylene glycol dipropyl ether, diethylene glycol dibutyl ether, ethylene glycol alkyl ether acetates such as methyl cellosolve acetate and ethyl cellosolve acetate, propylene glycol alkyl ether acetates such as propylene glycol monomethyl ether acetate (PGMEA), propylene glycol monoethyl ether acetate and propylene glycol monopropyl ether acetate, aromatic hydrocarbons such as benzene, toluene and xylene, ketones such as methylethylketone, acetone, methyl amyl ketone, methyl isobutyl ketone and cyclohexanone, alcohols such as ethanol, propanol, butanol, hexanol, cyclohexanol, ethylene glycol and glycerin, esthers such as ethyl acetate, ethyl lactate and ethyl 3-ethoxypropionate, and cyclic esters such as γ-butyrolactone.

The content of the coating composition of the present invention is preferably 30 wt. % or less, more preferably 10 wt. %, most preferably none, based on the total weight of the composition. A pigment and a filler to improve the strength of the coating may be added, if necessary.

Preparation Method of Coating Composition

The coating composition of the present invention can be prepared by mixing above mentioned each component and dispersing or dissolving uniformly. Here, sequence of the mixing is not limited. The coating composition of the present invention without a solvent or with little content of a solvent can form a relatively high viscosity composition layer. Thus, a mechanical dispersing machine is preferably used for the preparation of the coating composition.

Further, the coating composition of the present invention can be coated on a surface, and then heated and cured, as mentioned below. The polymer components are reacted by the heating and the composition becomes hardened to form a coating. Here, components in the coating composition can be preliminary reacted by heating the composition. Generally, this reaction is conducted at 20 to 40° C. for 1 to 2 hours under agitation.

Forming Method of a Cured Film

A cured film of the prevent invention can be obtained by coating above mentioned coating composition and curing. Specifically, the cured film is formed by following steps.

First, above mentioned coating composition is coated on a substrate. Coating the coating composition can be carried out by an arbitrary method conventionally known such as dip coating, roll coating, bar coating, brush coating, spray coating, doctor coating, flow coating, spin coating and slit coating. A suitable substrate such as metallic plate, wood, glass substrate and resin film can be used as the substrate coated with the composition. As the cured film of the prevent invention has excellent antifouling property, it is preferred to use for coatings for exterior of ships and underwater structures, especially. Thus, the substrate is preferably materials of exterior of ships, parts of underwater structures.

Film thickness of the coating layer before curing is not limited, but preferably 50 μm or more, more preferably 100 μm, to maintain enough antifouling property for a long time. On the other hand, the film thickness is preferably 500 μm or less, more preferably 300 μm or less, to reduce material cost and manufacturing cost with an increase in coating times.

Coating layer is then heated and cured. Heating temperature and heating time is adjusted to promote curing reaction sufficiently and reduce cost. Specifically, heating temperature is generally 20 to 100° C., preferably 25 to 80° C., and heating time is generally 1 to 24 hours, preferably 2 to 8 hours. As the curing reaction of the coating composition of the present invention is promoted by heating in a water vapor containing atmosphere, heating is preferably carried out under an atmosphere having 50 to 90% RH.

The film thickness of the cured film thus formed is preferably 30 to 300 μm, more preferably 50 to 200 μm.

The present invention is further explained using the following examples and comparative examples, but embodiments of the present invention are not restricted to these examples and comparative examples.

EXAMPLE 1

2610 g of triethoxy modified polymethyl/polydimethylsilazane (polysilazane (A), KiON HTA 1500 slow cure (trade name, Clariant K.K.)) was measured and introduced into a container made of stainless steel. 129 g of non-reactive polydimethylsiloxane (polydialkylsiloxane (B), Sigma-Aldrich Co. LLC., viscosity: 50 cst) was gradually added into it at room temperature while stirring at 200 rpm using Dissolver Dispermat AE 1C (trade name, VMA-Getzmann GMBH), and then 261 g of hydroxy modified polydimethylsiloxane (polydialkylsiloxane (C), Sigma-Aldrich Co. LLC., viscosity: 65 cst) was gradually added in it. After the addition, it was stirred at 1000 rpm for 10 minutes to obtain a coating composition.

EXAMPLE 2

A coating composition was prepared using the same procedure as example 1 except for 2400 g of polysilazane (A), 120 g of polydialkylsiloxane (B) and 480 g of polydialkylsiloxane.

EXAMPLE 3

A mixture was prepared using the same procedure as example 1 except for 2223 g of polysilazane (A), 111 g of polydialkylsiloxane (B) and 444 g of polydialkylsiloxane. Then, 222 g of acrylic polyol (Setalux C-1184 SS-51 (trade name, Nuplex Corporate)) was gradually added while stirring at 200 rpm. After the addition, it was heated to 60° C. with stirring and reacted for 3 hours to obtain a coating composition.

EXAMPLE 4

A mixture was prepared using the same procedure as example 1 except for 2214 g of polysilazane (A), 111 g of polydialkylsiloxane (B) and 444 g of polydialkylsiloxane. However, 9 g of cuprous oxide was added in twice during preparing the mixture. Then, a coating composition was prepared using the same procedure as example 3 except for 222 g of acrylic and stirring at 5000 rpm for 15 minutes.

EXAMPLE 5

A coating composition was prepared using the same procedure as example 1 except for 2610 g of polysilazane (A), 129 g of polydimethylsiloxane (polydialkylsiloxane (B'), Sigma-Aldrich Co. LLC., viscosity:20 cst), 261 g of polydimethylsiloxane (polydialkylsiloxane (C'), Sigma-Aldrich Co. LLC., viscosity:20,000 cst).

COMPARATIVE EXAMPLE

A coating composition comprising only polysilazane (A) was prepared.
Characteristic Evaluation of the Cured Film Each coating composition was applied on a substrate using a bar coater to obtain film thickness of 120 μm before curing. Obtained coating layer was heated under the condition of 60° C. and 60% RH for 6 hours to obtain a cured film. Here, if the film thickness of the comparative example was 120 μm before curing, there were cracks generated during curing process. Thus, the film thickness was adjusted to 12 μm by coating. Physical properties of the obtained cured film were evaluated as follows.

(a) Solvent Dissolution

Each coating composition was applied on glass slides with a bar coater of 120 μm. They were dried in laboratory conditions for 16 days. Then they were immersed for 24 h in 50 mL of hexane and dried at 30° C. in order to allow the evaporation of the solvent. The weights before and after immersing were measured. Whether non-reactive polysiloxane having high solubility to hexane (polysiloxane (B)) was eluted or not was evaluated from the difference of the weights. Any compositions did not elute polysiloxane (B).

(b) Water Contact Angle

Using a Digidrop (manufactured by GBX Instruments), water contact angles are measured five times to have an average value. The results are shown in Table 3.

(c) Cross-ruling Test

It is conducted in accordance with NF T30-038 (French Standard). The measurements were carried out three times to have an average value. Here, a visual examination allowed determining the percentage of peeling off and corresponding value scale from Table 1.

The results are shown in Table 3.

TABLE 1

| Scale | % of peeling off |
| --- | --- |
| 0 | 0% |
| 1 | 5% |
| 2 | 5%~15% |
| 3 | 15%~35% |
| 4 | 35%~65% |
| 5 | 65% and more |

(d) Exposure Test

Cured coatings were obtained by coating Two PVC panels (150×210 mm$^2$), which were used as substrates, with the coating composition by a bar coater and being cured. The exposure tests about obtained cured coatings were performed on a raft located in the Toulon Bay, following the NF T34-552 (French Standard). The evaluation was conducted by comparison of N number (N=Σ(I*G)) wherein I factor and G factor were evaluated by corresponding value scale from Table 2.

TABLE 2

| I factor (coverage of fouling on the surface %) | | G factor (condition) | |
| --- | --- | --- | --- |
| scale | % | scale | condition |
| 0 | no fouling | 0 | biofilm |
| 1 | less than 10% | 1 | non-adhesive algae |
| 2 | 10%~20% | 2 | adhesive algae and barnacles |
| 3 | 20%~40% | 3 | barnacles |
| 4 | 40%~60% | | |
| 5 | 60%~100% | | |

The results are shown in Table 3.

(e) Flexibility

Conical mandrel tests following the standard ASTM D522 were carried out. Those were measured three times to have an average value. The results are shown in Table 3.

TABLE 3

| | water contact angke | cross-ruling test | exposure test N number after 7 months | stretch rate |
| --- | --- | --- | --- | --- |
| Example 1 | 115° | 1 | 6 | 25% |
| Example 2 | 115° | 1 | 16 | 25% |
| Example 3 | 115° | 2 | 14 | 18% |
| Example 4 | 120° | 0 | 0 | 7% |

(f) Corrosion Resistance and Antifouling Property

Aluminum panels as substrates were coated with coating composition of Example 1 and cured. The obtained cured layers were sprayed with salt water and left. Then, checked whether the layers were eroded or not. As a result, it is confirmed that the layers after 1100 hours had the same corrosion resistance at commercially available epoxy primer.

Antifouling property after 10 months immersed in seawater was evaluated. As a result, it is confirmed that the layers had the same antifouling property at commercially available Intersleek 700 (trade name, AkzoNobel N.V.).

Further, aluminum panels as substrates were coated with coating composition of Example 4 and cured. The obtained cured layers were immersed in seawater for 10 months and evaluated. As a result, it is confirmed that the layers had the same antifouling property at commercially available Intersleek 700 (trade name, AkzoNobel N.V.).

The invention claimed is:

1. A coating composition comprising:
    (A) a polysilazane having alkoxy-modified silane group in a side chain,
    (B) a terminally alkylated polydialkylsiloxane, and
    (C) a polydialkylsiloxane having hydroxyl group at its terminal;
and further wherein said polysilazane is represented by the following formula (a):

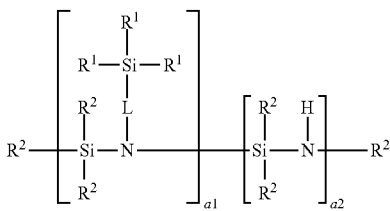

(a)

wherein
$R^1$ is hydrogen, alkyl group of 1 to 3 carbon atoms or alkoxy group of 1 to 3 carbon atoms,
where at least one $R^1$ is alkoxy group and each $R^1$ may be the same or different,
$R^2$ is hydrogen or alkyl group of 1 to 3 carbon atoms,
where each $R^2$ may be the same or different, two $R^2$ in the formula may be bonded to form a cyclic structure, and each $R^2$ in the formula and other polysilazane polymer unit $R^2$ represented by formula (a) may be bounded to form branched chain structure,
L is alkylene group of a single bond or 1 to 5 carbon atoms,
where each L may be the same or different,
a1 and a2 are the numbers indicating polymerization degrees of the first repeating unit and the second repeating unit, and each number is exceeding 0,
the first repeating unit and the second repeating unit may be bounded randomly or may form blocks.

2. The coating composition according to claim 1, wherein a1:a2, the ratio of said a1 to said a2, is 0.01:0.99 to 0.35:0.65.

3. The coating composition according to claim 1, wherein said polydialkylsiloxane (B) is represented by the following formula (b):

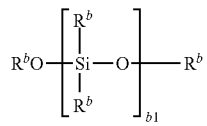

(b)

wherein
$R^b$ is alkyl group of 1 to 3 carbon atoms,
where each $R^b$ may be the same or different, and two $R^b$ in the formula may be bounded to form a cyclic structure, and any $R^b$ in the formula and other dialkyl-siloxane unit represented by formula (b) may be bounded to form branched chain structure, and
b1 is the number indicating degree of polymerization and exceeding 0.

4. The coating composition according to claim 1, wherein said polydialkylsiloxane (C) is represented by the formula (c):

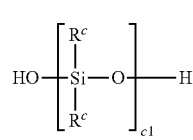

(c)

wherein
$R^c$ is alkyl group of 1 to 3 carbon atoms,
where each $R^c$ may be the same or different, two $R^c$ in the formula may be bounded to form a cyclic structure, and any $R^c$ in the formula and other polydialkylsiloxane unit $R^c$ represented by the formula (c) may be bounded to form branched chain structure, and
c1 is the number indicating degree of polymerization and exceeding 0.

5. The coating composition according to claim 1, wherein the compounding amount of said polydialkylsiloxane (B) and said polydialkylsiloxane (C) of said polysilazane (A) 100 parts wt. are respectively 3 to 20 parts wt. and 7 to 30 parts wt.

6. The coating composition according to claim 1, wherein weight-average molecular weight of said polysilazane (A), said polydialkylsiloxane (B) and said polydialkylsiloxane (C) are respectively 500 to 50,000, 350 to 70,000, and 700 to 90,000.

7. The coating composition according to claim 1, further comprising acrylic polyol.

8. The coating composition according to claim 1, further comprising cuprous oxide.

9. A cured film obtained by coating the coating composition according to claim 1 on a substrate and being cured.

10. A ship covered with the cured film according to claim 9.

11. The coating composition according to claim 2, wherein said polydialkylsiloxane (B) is represented by the following formula (b):

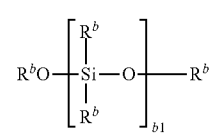

(b)

wherein
$R^b$ is alkyl group of 1 to 3 carbon atoms,
where each $R^b$ may be the same or different, and two $R^b$ in the formula may be bounded to form a cyclic structure, and any $R^b$ in the formula and other dialkyl-siloxane unit represented by formula (b) may be bounded to form branched chain structure, and
b1 is the number indicating degree of polymerization and exceeding 0.

12. The coating composition according to claim 2, wherein said polydialkylsiloxane (C) is represented by the formula (c):

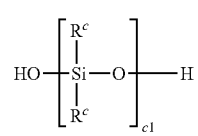

(c)

wherein
$R^c$ is alkyl group of 1 to 3 carbon atoms,
where each $R^c$ may be the same or different, two $R^c$ in the formula may be bounded to form a cyclic structure, and any $R^c$ in the formula and other polydialkylsiloxane unit $R^c$ represented by the formula (c) may be bounded to form branched chain structure, and c1 is the number indicating degree of polymerization and exceeding 0.

13. The coating composition according to claim 3, wherein said polydialkylsiloxane (C) is represented by the formula (c):

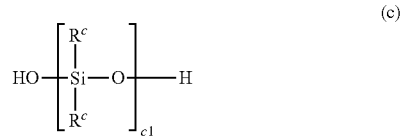

(c)

wherein $R^c$ is alkyl group of 1 to 3 carbon atoms, where each $R^c$ may be the same or different, two $R^c$ in the formula may be bounded to form a cyclic structure, and any $R^c$ in the formula and other polydialkylsiloxane unit $R^c$ represented by the formula (c) may be bounded to form branched chain structure, and c1 is the number indicating degree of polymerization and exceeding 0.

14. The coating composition according to claim 2, wherein the compounding amount of said polydialkylsiloxane (B) and said polydialkylsiloxane (C) of said polysilazane (A) 100 parts wt. are respectively 3 to 20 parts wt. and 7 to 30 parts wt.

15. The coating composition according to claim 3, wherein the compounding amount of said polydialkylsiloxane (B) and said polydialkylsiloxane (C) of said polysilazane (A) 100 parts wt. are respectively 3 to 20 parts wt. and 7 to 30 parts wt.

16. The coating composition according to claim 4, wherein the compounding amount of said polydialkylsiloxane (B) and said polydialkylsiloxane (C) of said polysilazane (A) 100 parts wt. are respectively 3 to 20 parts wt. and 7 to 30 parts wt.

* * * * *